United States Patent [19]

Hanagata

[11] Patent Number: 5,444,964
[45] Date of Patent: Aug. 29, 1995

[54] AUTOMATIC PACKAGE MACHINE, AND WRAPPING FILM FUSING AND SEALING BLADE

[75] Inventor: Toshiyuki Hanagata, Toyama, Japan

[73] Assignee: Hanagata Corporation, Toyama, Japan

[21] Appl. No.: 242,433

[22] Filed: May 13, 1994

[30] Foreign Application Priority Data

Jun. 22, 1993 [JP] Japan .................................. 5-150703
Jul. 7, 1993 [JP] Japan .................................. 5-167670

[51] Int. Cl.⁶ .......................... B65B 51/26; B65B 9/06
[52] U.S. Cl. ...................... 53/550; 53/373.5; 53/374.4; 156/324
[58] Field of Search ............... 53/450, 463, 479, 550, 53/373.4, 373.5, 374.4; 156/164, 324

[56] References Cited

U.S. PATENT DOCUMENTS

| | | | |
|---|---|---|---|
| 2,883,813 | 4/1959 | Shannon | 53/373.5 X |
| 2,987,107 | 6/1961 | Sylvester et al. | 53/373.5 X |
| 3,462,909 | 8/1969 | Anderson | 53/141 X |
| 3,552,088 | 1/1971 | Niwa | 53/373.5 X |
| 3,765,990 | 10/1973 | Histed et al. | 53/373.5 X |
| 4,211,599 | 7/1980 | Bolter et al. | 53/373.5 X |
| 4,219,988 | 9/1980 | Shanklin et al. | 53/373.5 X |
| 4,680,073 | 7/1987 | Brunner et al. | 53/373.5 X |
| 4,858,416 | 8/1989 | Monaghan | 53/373.5 X |

FOREIGN PATENT DOCUMENTS 62-18429 5/1987 Japan .
63-17696 4/1988 Japan .

Primary Examiner—Horace M. Culver
Attorney, Agent, or Firm—Hill, Steadman & Simpson

[57] ABSTRACT

The object of this invention is to provide an automatic package machine comprises a roll of wrapping film, a film opener for opening the film, which is drawn from the roll, into such a shape that the film can wrap an article to be wrapped, a conveyer for introducing the article, which is to be wrapped, into the opening of the film opened by the film opener, and a sealing unit situated contiguously to a downstream end of the conveyer for sealing edge portions of the film opening. The sealing unit includes a heater body, a fusing and sealing blade projecting from one end of the heater body, being vertically adjustable solely or together with the heater body, and being penetrable into the edge portions of the film opening parallel to a travelling path of the film, and two pairs of upper and lower feed rollers situated upstream and downstream, respectively, of the fusing and sealing blade. The fusing and sealing blade has along at least its upstream side edge a cutting edge.

16 Claims, 7 Drawing Sheets

FIG. 4(A)
FIG. 4(B)
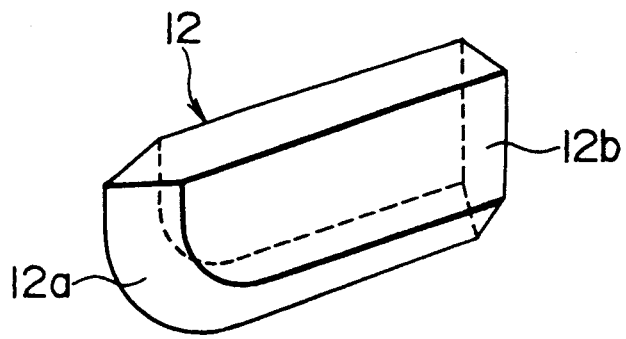
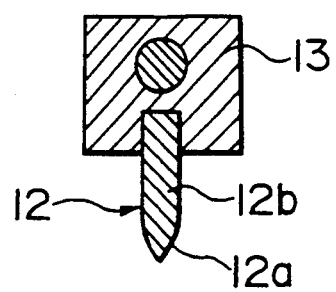
FIG. 5
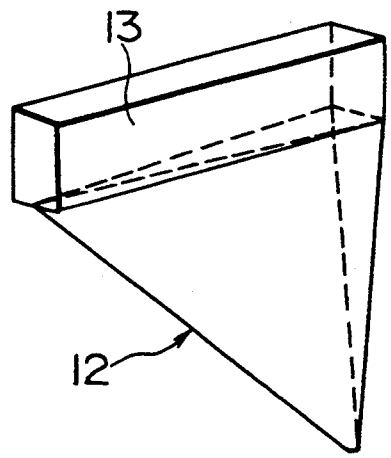
FIG. 6
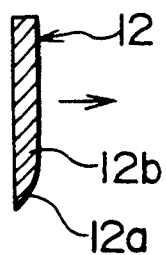

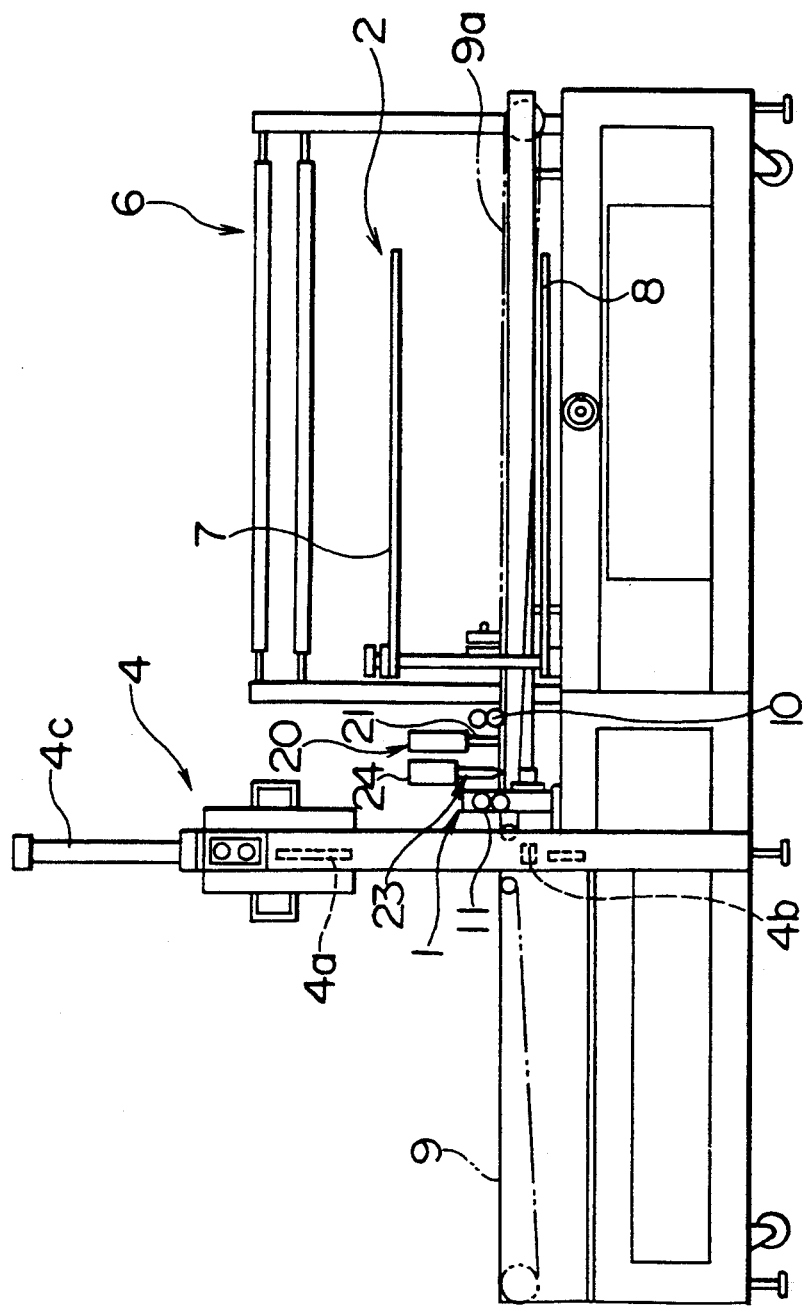

AUTOMATIC PACKAGE MACHINE, AND WRAPPING FILM FUSING AND SEALING BLADE

BACKGROUND OF THE INVENTION

1. Field of the Invention:

This invention relates to an automatic package machine for wrapping an article by drawing a wrapping film from a roll, placing the article in the film, and then fusing and sealing the film at predetermined positions to form a bag, and also to a wrapping film fusing and sealing blade for use in the automatic package machine. More particularly, the invention relates to an automatic package machine equipped with means for reliably fusing and sealing edge portions of upper and lower film parts, irrespective of the shape and size of the article to be wrapped, and also to a wrapping film fusing and sealing blade as the fusing and sealing means.

2. Description of the Related Art:

An automatic package machine developed by the present inventor(s) and using a folded film is known from, for example, Japanese Utility Model Publication No. SHO 62-18429. According to the prior art automatic package machine, an L-type sealing unit having a wrapping film fusing and sealing blade seals the folded film openings perpendicular and parallel to the folding direction of the film simultaneously.

However, for reliably fusing and sealing the two film parts simultaneously, it is essential that air should not exist between the two film parts inside the fused and sealed portion. If air exists between the film parts inside the fused and sealed portion, the two film parts would be locally peeled off in the operative portion of the fusing and sealing blade so that fusing and melting will proceed with the upper and lower film parts only partially sealed. Accordingly the upper and lower film parts would be locally unsealed; that is, a so-called pin hole phenomenon would occur to cause imperfect sealing.

With the above-mentioned L-type sealing unit in particular, since the film parts are fused and sealed longitudinally and transversely of the travelling path of the film, air existing between the two film parts would increase in pressure, as kept in the sealed portion during sealing, thus urging to spread the sealed film parts. Further, if the article is to be wrapped in film by the L-type sealing unit in such a manner that the film is brought against the article as closely as possible, and particularly if the height of the article is relatively large, the film would inevitably be deformed on a large scale. This would result in imperfect sealing. Consequently, it has been customary to provide a pair of film pressers one on each side of the wrapping film fusing and sealing means to clamp the fused and sealed portions of the film parts between the film pressers and a receiving member, thus eliminating the air while fusing and sealing. By this mechanical pressing, it would be difficult to achieve a perfect contact between the two film parts, even with the use of a highly precise mechanical process, so that the above-mentioned problems cannot be avoided on many occasions. It is therefore necessary to use a film wider than necessary in order to increase the distance between the sealing lines and an article to be wrapped, thus not only marring the appearance of the wrapped product but also increasing the amount of film consumption.

For the automatic package machine employing a sealing unit other than the above-mentioned L-type sealing unit, it is known to place the article between two elongated films superposed or two parts of a film folded and to perform sealing of the upstream and downstream ends independently of the sealing of one or both of side edges. It is known that the upstream and downstream ends are sealed by a so-called I-type sealing unit using a straight heat bar, while the individual side edge is sealed by upper and lower sealing discs rotating along the sealing line between a horizontal pair of upper endless belts and a horizontal pair of lower endless belts while the two films or film parts are clamped and conveyed thereby. According to this sealing method, since the upstream and downstream ends or the side edge(s) are open during sealing the edge(s) or ends, the influence by the air existing between the films or film parts is small, compared with that of the L-type sealing unit.

As an alternative, a pyro-electric package machine, which charges merely static electricity on the upper and lower film parts and joins the opening edge portions of the upper and lower film parts by electrostatic sealing without tile above-mentioned heating means, is disclosed in, for example, Japanese Patent Publication No. SHO 63-17696.

However, in the package machine which performs the sealing of the upstream and downstream ends and the sealing of the side edges individually by fusing and sealing, each side of the film parts is brought into contact with one another mechanically by the film presser and endless belts while the intermediate portions of the two film parts are unsealed. This allows air to exist between the film parts so that the above-mentioned pin holes can not be perfectly eliminated.

Specifically, with the side edge sealing unit, since the film side edge portions to be sealed are pressed against one another between the upper and lower endless belts, it is necessary to push the upper and lower belts Uniformly along the entire length of the belts on the film travelling side in order to obtain a uniform contact. However, partly since endless belts tend to become loose and partly since the upper and lower sealing discs are situated between the endless belts, it is very difficult to achieve a uniform contact between the two film parts.

In this kind of automatic continuous package machine, it is inevitable that the travelling of the film is temporarily stopped when the two film parts are sealed at least in a direction perpendicular to the travelling path of the film. At that time the upper and lower sealing discs must be temporarily separated from the film surfaces. If the sealing discs are not separated from the film surfaces, the melted portions would be enlarged to be carbonized while the two film portions compressed by the upper and lower sealing discs are separated, so that such portions would have pin holes, thus making the sealing untidy.

On the other hand, according to the electrostatic sealing, since the upper and lower film parts adhere to each other merely electrostatically, they can be sealed reliably, as disclosed in the above-mentioned publication, when shrunk in a subsequent stage of process; if not shrunk, they tend to be separated so that adequate sealing cannot be expected. Even if they are shrunk, e.g., when an article to be wrapped contains much water, static electricity on the film would be eliminated due to the water so that the adhesion will disappear at all and, as a result, adequate sealing cannot be expected.

SUMMARY OF THE INVENTION

A first object of this invention is to provide an automatic package machine equipped with a means which is simple in structure and suitable for fusing and sealing the opening of upper and lower thermally fusible film parts, especially along the opening edge portions parallel to the travelling path of the film, wrapping an article in unform contact with the film parts without giving any unnecessary pressure.

A second object of the invention is to provide an automatic package machine for sealing upper and lower film parts in uniform contact with an article wrapped therein, by utilizing the film adhesion by static electricity and using a simple structure, without giving any unnecessary pressure and tension.

A third object of the invention is to provide a film fusing and sealing means which enables fusing and sealing reliably simultaneously with the feed of films, without using a conventional heat bar for fusing and sealing the film as compressed on their upper and lower sides.

According to a first aspect of the invention, there is provided an automatic package machine comprising, a roll of wrapping film, a film opener for opening the film, which is drawn from the roll, into such a shape that the film can wrap an article to be wrapped, a conveyer for introducing the article, which is to be wrapped, into the opening of the film opened by the film opener, and a sealing unit situated contiguously to a downstream end of the conveyer for sealing edge portions of the film opening. Further the sealing unit includes a heater body, a fusing and sealing blade being heated by the heater body, projecting from one end of the heater body, being vertically adjustable soley or together with the heater body, and being penetrable into the edge portions of the film opening parallel to a travelling path to the film, and two pairs of upper and lower feed rollers situated upstream and downstream, respectively, of the fusing and sealing blade, the fusing and sealing blade having along at least its upstream side edge a cutting edge.

Preferably, the cutting edge of the fusing and sealing blade has a generally V shape in either cross section or holizontal cross section and the angle of the V shape of the cutting edge is within a range of 5° to 15°, more preferably 8° to 12°. The cutting edge is formed along only a distal end of the edge of the fusing and sealing blade or along the entire edge of the fusing and sealing blade. If the cutting edge is formed along only one side of the fusing and sealing blade, the angle of the V shape of the cutting edge is preferably within a range of 2.5° to 7.5°.

According to a second aspect of the invention, there is provided an automatic package machine comprising a roll of wrapping film, a film opener for opening the film, which is drawn from the roll, into such a shape that the film can wrap an article to be wrapped, a conveyer for introducing the article, which is to be wrapped, into the opening of the film opened by the film opener, and a sealing unit situated contiguously to a downstream end of the conveyer for sealing edge portions of the film opening. Further, the sealing unit includes fusing means for fusing the edge portions of the film opening parallel to a travelling path of the film, and electrostatically charging means situated adjacent to the edge portions of tile film opening between near the conveyer and the fusing means. The fusing means includes a heater body, a fusing and sealing blade being heated by tile heater body, projecting from one end of the heater body, being vertically adjustable solely or together with the heater body, and being penetrable into the edge portions of the film opening parallel to the travelling path of tile film. The fusing and sealing blade has along at least its side edge a cutting edge. The cutting edge of the fusing and sealing blade has a generally v shape in both of cross section and holizontal cross section and the angle of the V shape of the cutting edge is within a range of 5° to 15°. The cutting edge is formed along only a distal end of tile edge of time fusing and sealing blade or along the entire edge of the fusing and sealing blade.

In an alternative form of the secong aspect, the fusing and sealing means includes a heater body, and a bar-shaped fusing and sealing blade projecting from one end of the heater body, being vertically adjustable solely or together with the heater body, and being penetrable into the edge portions of the film opening downwardly from the travelling path of the film, the bar-shaped blade being tapered toward its lower end.

The operation of the automatic package machine using the folded film will now be described. As the automatic package machine with an article placed on the conveyer is started, feed rollers begin rotating to draw the folded film from the film roll, and then the direction of travelling of the films is changed by 90° and the film will be turned reversely by the film opening unit and, at the same time, the folded film is fed toward the first sealing unit while it is being opened into a generally C-shape cross section. At that time, the article placed on the conveyer driven and extending through the opening of the folded film is progressively introduced between the upper and lower film parts.

When the film portion in which the article is wrapped arrives at the first sealing unit, the side edge of the film opening is clamped between the upper and lower feed roller pairs spaced a predetermined distance from one another along the travelling path of the film and is advanced in tension to the downstream side. At the same time, between the upstream and downstream feed rollers, the upper and lower film parts are fused and sealed continuously along the sealing line on the opening side edge parallel to the travelling path of the film, while the distal end of the fusing and sealing blade penetrates the film parts. Since the opening edge portions of the upper and lower film parts passing between the upper and lower feed roller pairs arranged at the upstream and downstream positions are tensed in the direction of travel of the film, the film parts would become slightly wavily puckered only in the widthwise direction of the film, keeping a uniform contact respectively.

As a result, the film portions to be sealed would keep in a uniform contact with each other in a certain width at least when passing the fusing and sealing blade, and air exisiting between the upper and lower film parts is eliminated perfectly and, at the same time, a downward component force acts on the fused film parts due to the shape of the cutting edge and the tapering end of the fusing and sealing blade, thus bringing the upper and lower film parts into intimate contact with one another. Further, the angle of the cutting end allow the fused film edge at least of the article side to shrink and shift sideways so that the upper and lower film parts moving adjacent to or in contact with the blade side surface can be sealed reliably and neatly, thus causing adquate sealing. Subsequently, since the fused film edge is pressed flat by the upper and lower feed roller pair on the downstream side and, at the same time, is cooled, firm and uniform sealing can be achieved.

If the angle of the cutting end is larger than the uppermost limit, the extent to which the fused film edge escapes from the fusing and sealing blade is too large so that melting after fused will continue, thus causing inadequate sealing between the the upper and lower film parts. If the angle of the cutting end is smaller than the lowermost limit, the sidewise pressure on the fused film edge by the fusing and sealing blade would become smaller to cause only inadequate sealing between the upper and lower film parts. If the cutting end of the blade has a V shape, the fused film edges are pressed toward the article side and the scrap side while fused by the cutting surface, thus causing reliable fusing between the upper and lower film parts. In this invention, however, the cutting end of the blade has a cutting surface on one side and a perpendicular surface on the other side, in which case the cutting surface is situated toward the article to be wrapped.

In fusing and sealing by the first sealing unit, since the second sealing of the downstream film end is already terminated in the previous wrapping, the article accommodated in the film is placed on and conveyed by the conveyer. When the upstream sealing line transversely crossing the folded film arrives at the second sealing unit, time feed rollers and the conveyer will be temporarily stopped so that the feed of film will be temporarily stopped. When the feed of tile film is stopped, a fusing and cutting bar is lowered toward the receiving member of the second sealing unit to fuse and seal the upper and lower film parts transversely along the sealing line of the downstream end of the film parts, thus finishing the wrapping.

At that time, the fusing and sealing blade of the first sealing unit is kept in the same position. Although the fused film portion is in contact with or adjacent to the fusing and sealing blade while the feed of the film is stopped, the heat capacity of the blade portion along the travelling path of the film is small so that the melted region of the fused film portion is not enlarged. This operation is peculiar to the blade to this invention.

Upon completion of sealing by the second sealing unit, all operative parts such as the conveyer, the discharging unit and the feed rollers start operating to initiate sealing the side edges of the film parts for time next article. The wrapped article is discharged, by the discharging unit, to a subsequent station where the film is shrunk while passing through a heating tunnel if neccesary.

If static electricity is charged by an electrostatic charging means before fusing and sealing, the opening ends of the upper and lower film parts are attracted to one another in uniform intimate contact. Since this intimate contact is by electrical attraction rather than by any mechanical external force by a film pressers or belts, the upper and lower film parts would hardly become separate and would remain the uniformly intimate contact over a predetermined width, and this intimateness will not be impaired by heating. As a result, the seal portions of the film are kept in uniformly intimate contact over a certain width at least until they pass the fusing and sealing blade, and in the seal portions, air existing between the upper and lower film parts is perfectly eliminated so that adequate and reliable sealing can be achieved even by a simple fusing and sealing means in the form of a heating bar penetrating the travelling film.

When one side edge of the film is sealed along a predetermined length by the first sealing unit, the front ends of the film are already sealed during the previous wrapping, and the article wrapped in the film is placed on and conveyed by the succeeding discharging unit. When the rear sealing line transversely crossing the film arrives at the second sealing unit, then the feed rollers and the discharging unit will be temporarily stopped to temporarily stop the feed of the film, When the feed of the film is stopped, the fusing and cutting bar is lowered toward the receiving member of the second sealing unit to fuse and seal the upper and lower film parts transversely along the sealing line of the rear film end, thus finalizing the wrapping operation. At the same time, the bar-shaped fusing and sealing blade of the first sealing unit is raised to retract from the position where the bar-shaped fusing and sealing blade contact with the film. This is to prevent the melted area of the film from being unnecessarily enlarged by the bar-shaped fusing and sealing blade while the feed of the film is stopped.

With the automatic package machine of this invention, partly since the upper and lower feed roller pairs are arranged following to the fusing and sealing blade or the heating bar, and partly since fused film edges are positively moved under pressure, the melted film edges are compressed and sealed and, at the same time, cooled to secure more reliable sealing. Since the sealing length of the sealing unit can be set as desired, it is possible to wrap elongate articles or articles of different lengths by the same machine so that the sealing unit, unlike the conventional L-type sealer, can be reduced in size.

BRIEF DESCRIPTION OF THE DRAWINGS

FIGS. 4(A) and 4(B) show a fusing and sealing blade of the first sealing unit according to the first embodiment;

FIG. 5 is a perspective view showing a modified form of the fusing and sealing blade;

FIG. 6 is a cross sectional view showing another modified form of the fusing and sealing blade;

FIG. 10 is a front view showing the whole of the automatic package machine of FIG. 7.

DETAILED DESCRIPTION

Figure 1:
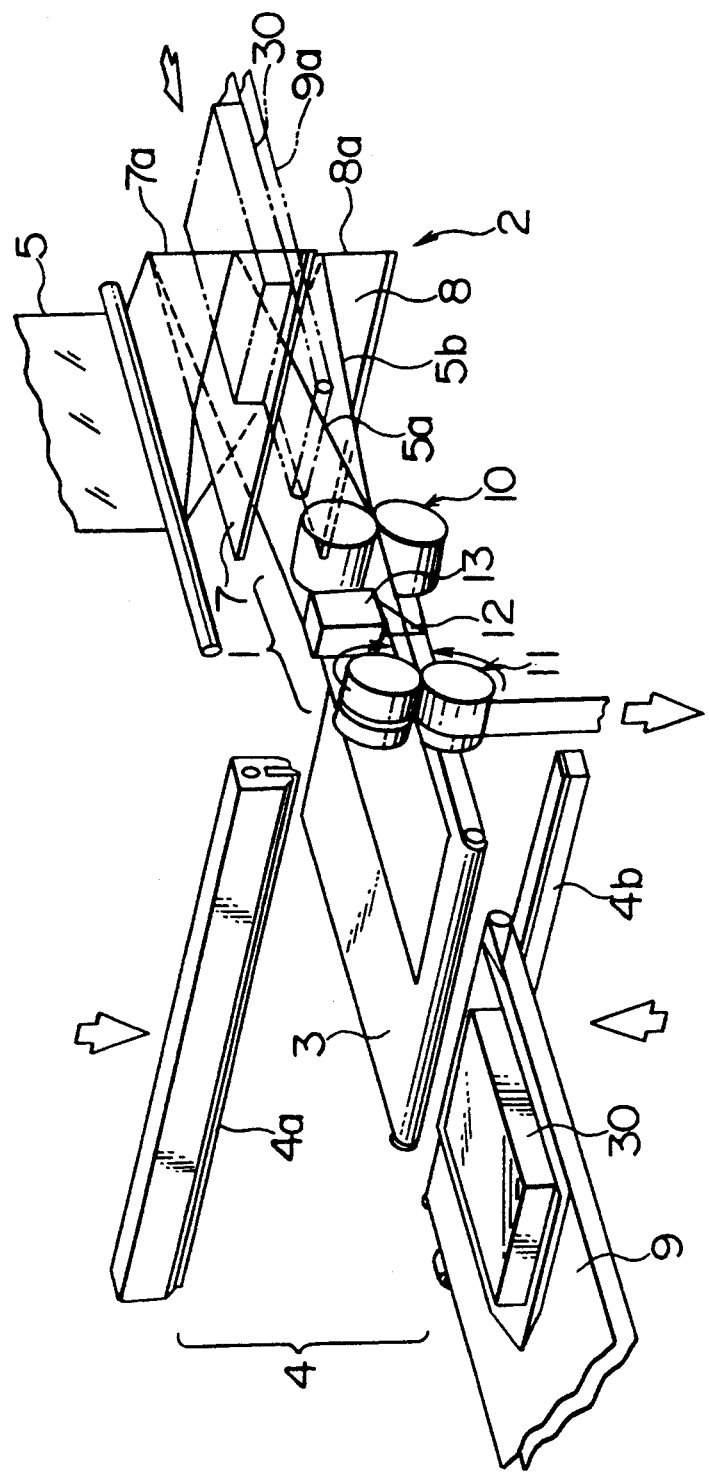
FIG. 1 is a perspective view schematically showing an automatic package machine, in which a folded film is used, according to a first embodiment of this invention.
Figure 2:
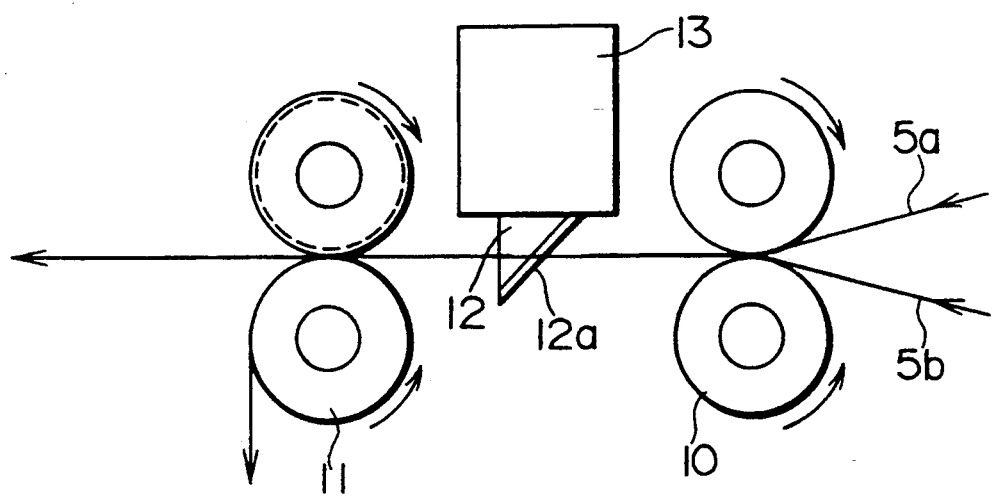
FIG. 2 is a side view showing the main part of a first sealing unit of the automatic package machine.
Figure 3:
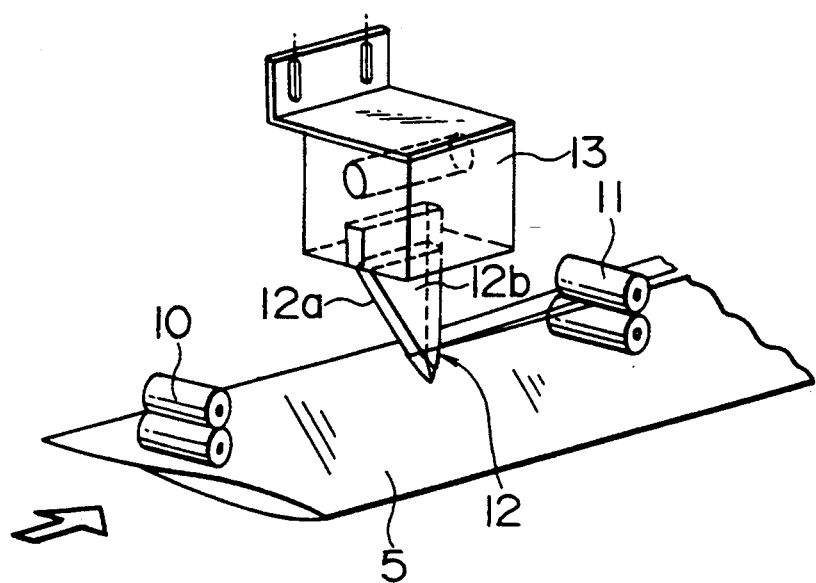
FIG. 3 is a perspective view of FIG. 2.
Figure 7:
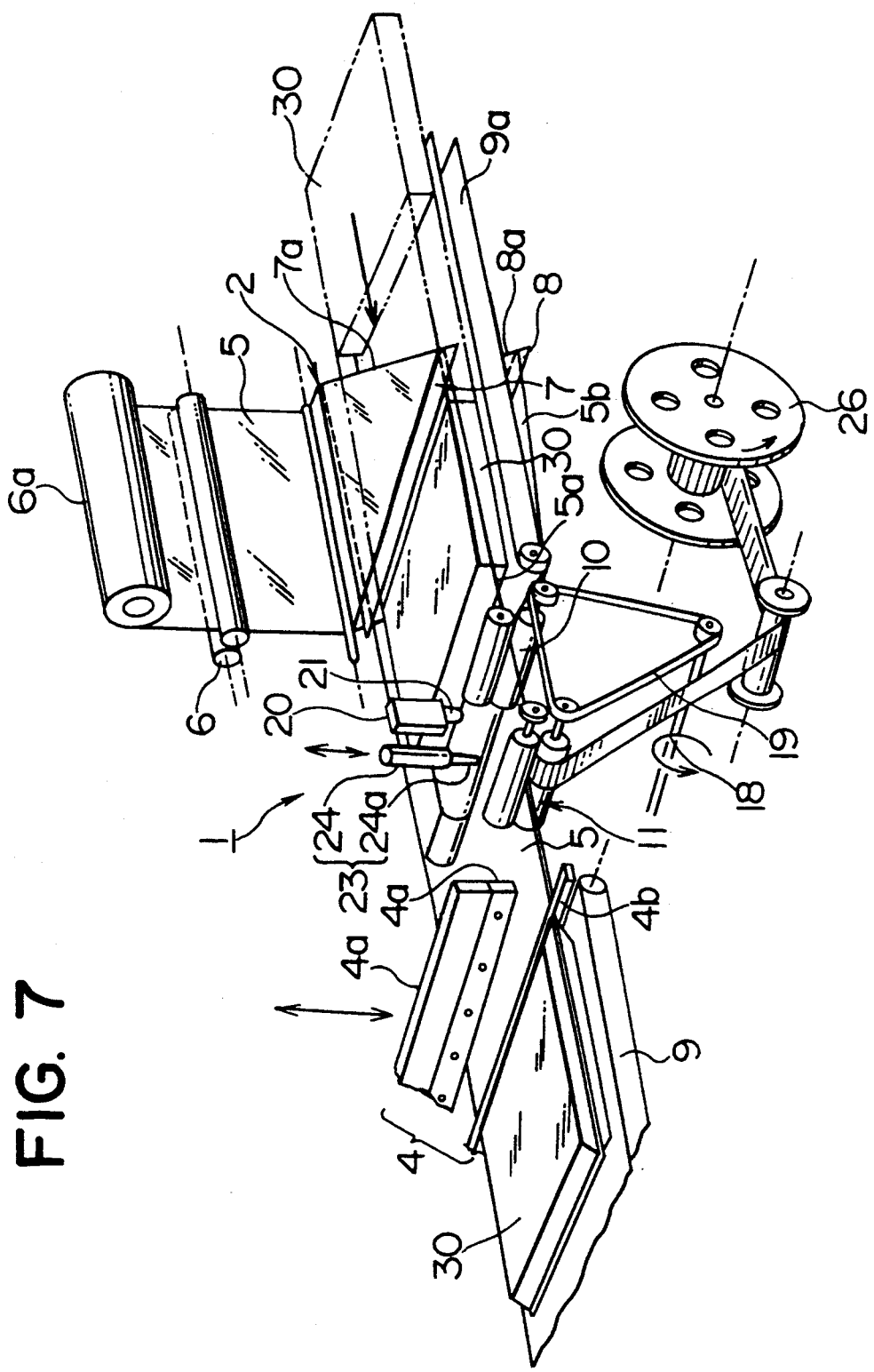
FIG. 7 is a perspective view of an automatic package machine according to a second embodiment of the invention.
Figure 8:
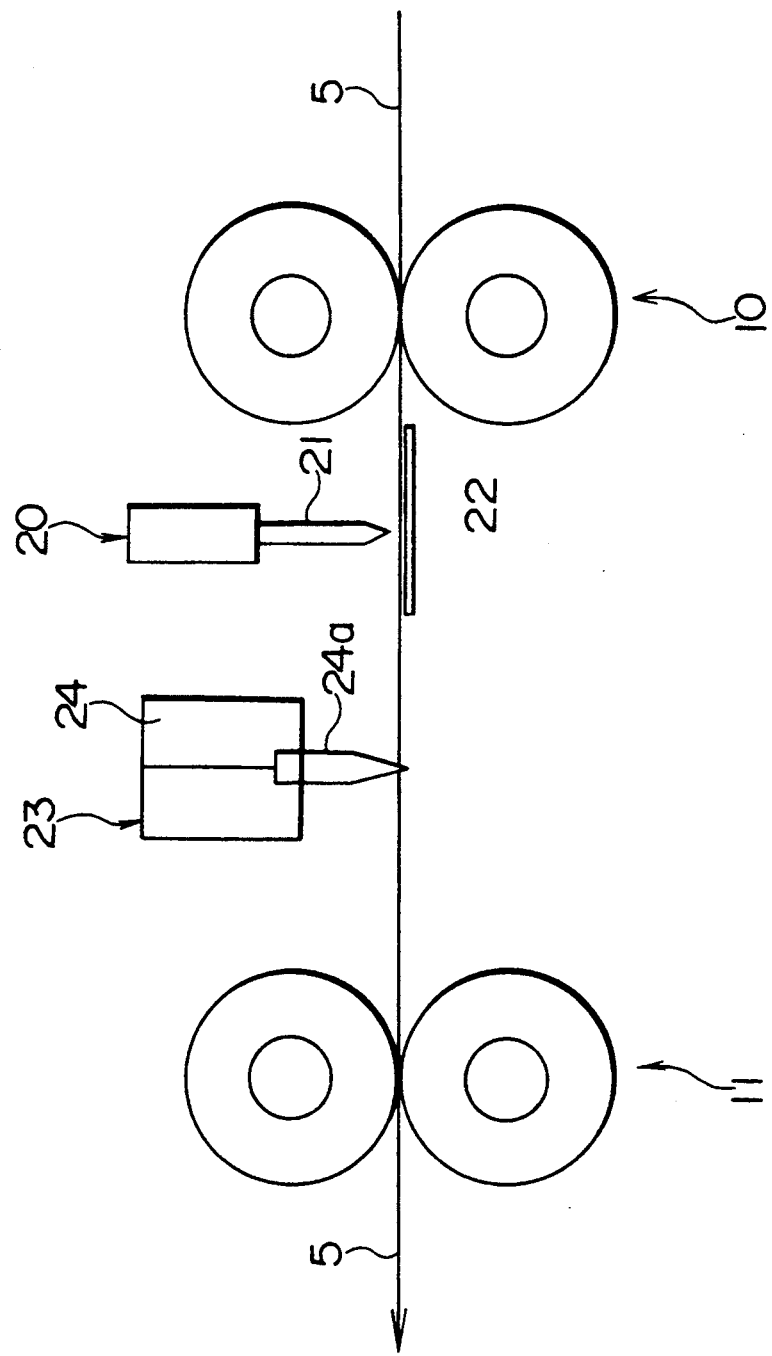
FIG. 8 is a side view showing the main part of a first sealing unit of the automatic package machine of FIG. 7.
Figure 9:
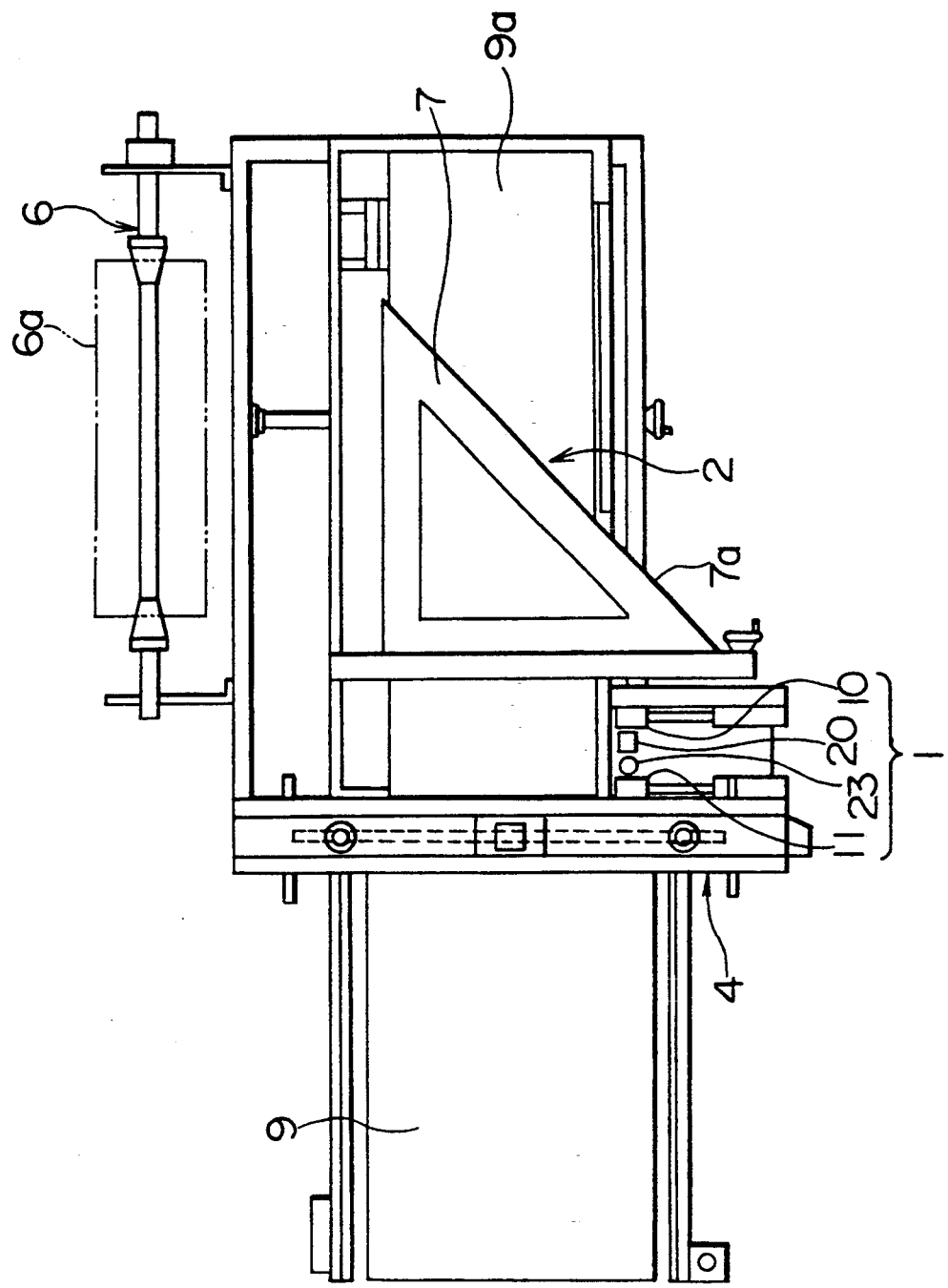
FIG. 9 is a plan view of FIG. 7.

Embodiments of this invention will now be described with reference to the accompanying drawings. FIGS. 1 through 3 show an automatic package machine according to the first embodiment of the invention. In this embodiment, the automatic package machine wraps an article in a folded film and seals the film opening. This invention should by no means be limited to using a folded film; for example, two films may be superposed, and an article may be inserted between the superposed films, during which the films are continuously fused and sealed at the front and rear open ends and opposite open side edges.

In the illustrated example, the automatic package machine comprises a first sealing unit 1 for fusing and sealing an opening parallel to the travelling path of a folded film 5, a conveyer 9a for conveying an article into the first sealing unit 1, a film feed unit holding a non-illustrated film roll and drawing a folded film 5 from the film roll, a film opener 2 form opening the folded film 5 in such a shape as to wrap an article, a wrapped article transfer belt 3 parallel to the first sealing unit 1, and a second sealing unit 4 situated adjacent to and downstream of the wrapped article transfer belt 3 for fusing and sealing the opening perpendicularly to the travelling path of the film.

The folded film 5 is wound in a film roll. Alternatively a wide film may be wound in a film roll; in this case, a film folding unit must be situated between the film roll and the film opener 2.

The film opener 2 has a known mechanism for inverting the folded film 5 and opening it in a generally C shape. The mechanism includes a vertical pair of guide plates 7, 8, each of which has an orthogonal equilateral triangle, a non-illustrated support post holding the upper and lower guide plates 7, 8, and the article conveying belt 9a inserted through the space between the upper and lower guide plated 7, 8. The upper and lower guide plates 7, 8 are extending parallel to the article conveying belt 9a. The upper and lower guide plates 7, 8 have diagonal edges 7a, 8a, respectively, at an angle of 45° to the moving direction of the article conveying belt 9a. The folded film 5 is drawn from the film roll, while the upper and lower film parts 5a, 5b are superposed in intimate contact with each other, and the upper and lower film parts 5a, 5b are inverted as they are bent diagonally along the respective diagonal edges 7a, 8a of the upper and lower guide plates 7, 8. As a result, the upper and lower film parts 5a, 5b are separated to form an opening in a generally C-shaped cross section and are turned by 90° to the direction of drawing the film from the film roll. At that time, the article conveying belt 9a between the upper and lower guide plates 7, 8 is positioned between the upper and lower film parts 5a, 5b. A number of successive articles carried on the article conbeying belt 9a at distances are automatically inserted one by one into the space between the upper and lower film parts 5a, 5b.

The first sealing unit 1, which is a characteristic feature of this invention, is situated adjacent to and downstream of the article conveying belt 9a. The first sealing unit 1 includes first and second feed roller pairs 10, 11 arranged at upstream and downstream positions spaced a predetermined distance along the travelling path of the film 5. The first sealing unit 1 also includes a film fusing and sealing blade 12, which is the most important characteristic feature of the invention. The film fusing and sealing blade 12 is situated between the first and second feed rollers 10, 11, having an upstream directed cutting edge 12a for penetrating vertically into the film sealing line. In order to fuse and seal the folded film 5, the first sealing unit 1 should be positioned on one side edge parallel to the film travelling path. However, in an automatic package machine of the type in which an article is placed between two films superposed, two identical first sealing units 1 may be positioned one on each side of the film travelling path.

The film fusing and sealing blade 12 is projecting integrally from the lower end of a heater body 13. By making the rotational speed of the downstream feed roller pair 11 slightly higher than that of the upstream feed roller pair 10, a pulling force acts on the folded film 5 travelling between the upstream and downstream feed roller pairs 10, 11, thus making the upper and lower film parts 5a, 5b contact intimately with each other. At that time, since the pulling force acts on only the side edges of the side edges of the folded film 5, the film at such edge portions would become warily puckered sideways to prevent air from moving into and out of the film 5. Accordingly, since the film parts 5a, 5b would be in uniform contact with each other throughout the entire area, any air does not exist between the upper and lower film parts 5a, 5b during subsequent fusing and sealing stage, and the fusing and sealing process of the intermediate portion can be performed smoothly.

In the illustrated example, the film fusing and sealing blade 12 is in the form of an orthogonal triangular plate of aluminum alloy having two acute ends. The film fusing and sealing blade 12 has, on one side extending between the two acute ends, a cutting edge 12a of an about 8 mm width and a V-shaped cross section of an about 10° angle. The blade body 12b other than the cutting edge 12a is generally flat on opposite surfaces. As the cutting edge 12a of V-shaped cross section extends diagonally downwardly of the travelling path of the film 5, a downward component force acts on the upper and lower film parts 5a, 5b when they are fused, thus bringing two film parts 5a, 5b against each other with improved intimateness. Assuming that the angle of the cutting edge 12a is set to around 10°, since the fused edge of the film 5 is moved toward the article 30, the melted portion of the fused edge will be intensive to facilitate sealing.

The temperature of the film fusing and sealing blade 12 is controlled to be higher than a melting temperature and lower than a combustion temperature of the folded film 5. This temperature depends on the quality of film; in the case of polyethylene, for example, the temperature should be set to around 200° C. The melted range of the film 5 depends on the extent to which the cutting end of the blade 12 penetrates the film; in order to increase the melted range, the cutting distal end of the blade 12 should be shifted to a lower position so that the contacting length of the body 12b and the film 5 will be extended. In order to reduce the melted range, on the contrary, the blade 12 is raised to make adjustment so as to reduce the contacting length of the body 12b and the film 5. As the film 5 is melted to a certain extent, a melted portion is formed at the edge portions of the upper and lower film parts 5a, 5b, and when this melted portion is cooled, the film parts 5a, 5b are sealed integrally. Preferably the melted range of the film 5 should be wide.

The first and second feed roller pairs 10, 11 constitutes a film feed unit to be intermittently driven by a non-illustrated motor via a non-illustrated conventional transmission mechanism, feeding the film 5 together with an article in synchronism with the article transfer belt 3. In this embodiment, in order that the film 5 will not be relaxed between the first and second feed roller pairs 10, 11, the rotational speed of the second feed roller pair 11 is set to a value slightly higher than that of the first feed roller pair 10 to give a predetermined tension to the film 5 between the first and second feed roller pairs 10, 11. This tension may be set to a desired value within the range in which the upper and lower film parts 5a, 5b are intimately contacted with each other reliably. However, if the tension is to be increased, it is desirable to reduce the distance between the first and second feed roller pairs 10, 11 to a minimum. Further, since the downstream feed roller pair 11 not only feed the film 5 but also compresses and cooled the film edges which are melted as fused by the fusing and sealing blade 12, the fused portions can be sealed more reliably to cause adequate sealing.

A second sealing unit 4 situated following to the first sealing unit 1 is substantially identical in construction with a conventional heating bar. The folded film is compressed along the sealing lines on the opposite sides by non-illustrated film pressers and is fused by a heated fusing and cutting bar 4a, and at the same time, the fused opening edges are sealed. An receiving member 4b is situated below the fusing and cutting bar 4a. The second sealing unit 4, as is well known in the art, is also equipped with a non-illustrated driving air cylinder for moving the fusing and cutting bar 4a vertically. A wrapped article discharging belt 9 for discharging a wrapped article is situated adjacent to and downstream of the sealing unit 4. Downstream of the first sealing unit 1, a non-illustrated roll for winding scrap portions of the film 5 fused and cut by the film fusing and sealing blade 12 is situated and is driven in synchronism with the driving of the feed roller pairs 10, 11.

According to the automatic package machine of this embodiment, as the automatic package machine with the article conveying belt 9a carrying an article 30 is started, the feed roller pairs 10, 11 begin to rotate and, at the same time, the article transfer belt 3 begins to rotate, so that the folded film 5 is drawn from the non-illustrated film roll and is then turned by 90° to the film travelling direction by the film opener 2. Then the folded film 5 is inverted and is conveyed to the first sealing unit 1 while it is being opened into a generally C-shaped cross section. At that time, the successive articles 30 carried on the article conveying belt 9a being moved through the opening of the folded film 5 are introduced on at a time between the upper and lower film parts 5a, 5b.

When the folded film 5 with the article 30 received between the upper and lower film parts 5a, 5b has been moved from the article conveying belt 9a to the article transfer belt 3 and then transferred to the first sealing unit 1, one edge of the opening of the folded film 5 will be clamped between the first and second feed roller pairs 10, 11 and will then be advanced to the downstream side. At that time, the upper and lower film parts 5a, 5b between the first and second feed roller pairs 10, 11 are in intimate contact with each other so that fusing and sealing can reliably take place along the sealing line parallel to one edge of the opening of the folded film 5.

This contact is not due to any mechanical external force such as by the film presser or belt, but due to the pulling force acting on the upper and lower film parts 5a, 5b and the downward component force by the cutting edge 12a of the blade 12 during fusing. At the same time, the folded film 5 is become wavily puckered sideways so as to reliably prevent air from coming into and out of the film 5. Accordingly it is possible not only to improve in keeping the intimate contact which prevents from peeling off, but also to realize uniform contact between the upper and lower film parts 5a, 5b along a predetermined width. Such contact performance will not be deteriorated even by heating. As a result, the superposed film parts 5a, 5b are kept in uniform contact with each other along a certain width until at least they reach the feed roller pair 11 via the fusing and sealing blade 12. so that air existing between the upper and lower film parts 5a, 5b will be perfectly eliminated from the film portion to be sealed. It is therefore possible to secure adequate and neat sealing with the simple fusing and sealing means such as the fusing and sealing blade 12.

When a predetermined length of sealing is made along one side edge of the folded film 5 by the first sealing unit 1, also the article 30 received in the folded film 5, whose front end was sealed during the previous wrapping, will be conveyed from the article transfer belt 3 to the wrapped article discharging belt 9 to pass the first sealing unit 1. This passing is detected by a non-illustrated sensor. Then when the rear sealing line of the folded film 5 arrives at the second sealing unit 4, the first and second feed roller pairs 10, 11 and the wrapped article discharging belt 9 will be temporarily stopped to temporarily terminate the feed of film 5.

Upon termination of the film feed, a nonillustrated cylinder of the second sealing unit 4 will become operative to lower the fusing and cutting bar 4a toward the receiving member 4b so that the upper and lower film parts 5a, 5b will be fused and sealed along the rear sealing line of the folded film 5, thus finalizing the wrapping. In the sealing unit using the blade 12 of this invention, it temporarily stops the feed of film when the second sealing unit 4 is operative, during which the fusing and sealing blade 12 should not be necessarily raised to retract from the contact position where it is in contact with the film 5. Since the thermal capacity of the fusing and sealing blade 12 is small, even while the feed of film 5 is stopped, the melted portions of the film 5 will not be increased. Depending on the quality of film or the heating temperature of the blade, the blade may be temporarily retracted from the film surface when stopping the feed of film.

Upon completion of fusing and sealing the rear end of the film by the second sealing unit 4, all of the parts such as the article conveying belt 9a, the wrapped article transfer belt 3, the wrapped article discharging belt 9 and the first and second feed roller pairs 10, 11 will become operative so that the sealing of side edge of the film for the next article 30 by the first seal unit 1 will take place in the above-mentioned manner. The wrapped article 30 will then be discharged from the wrapped article discharging belt 9 to the next station such as a shrinking station where the film 5 will be shrunk while passing through a non-illustrated heating tunnel.

FIG. 4 shows a modified form of the fusing and sealing blade 12. The modified blade 12 is in the form of a generally quarterly oval disc of a 4 mm thickness, a 25 mm minor axis and a 140 mm major axis, having, along its outer periphery, an 8 mm wide cutting edge 12a of a V-shaped cross section whose angle is 10°. Alternatively, the contour of the blade 12 may be a quarterly circular disc. The blade 12 having this kind of contour is particularly suitable for sealing a functional film such as an anti-fog film or a laminate film. In the case of an anti-fog film, for example, the film is oily and hence reliable fusing would have been difficult to achieve. Whereas in this invention, an adequate degree of sealing strength can be achieved by using the above-mentioned shape of blade.

FIG. 5 shows another modified form of the fusing and sealing blade 12. This modified blade 12 is in the form of a right triangular pyramid having two acute apices. In the illustrated example, the blade 12 has a cutting edge along the entire edge, being of a V shape in both of vertical and horizontal cross sections. In this pyramid-shape blade, unlike the first embodiment and the previous modification, it is difficult to seal the functional film neatly, but it is particularly suitable for fusing and sealing a one-component film such as of polyethylene or polypropylene.

FIG. 6 shows a blade having a blade on one side surface and a surface parallel to the sealing line on the other side, not having a V-shaped cross section. Assuming that the shape of cutting edge of the blade 12 is a V shape as the previous example, the film edge being fused is forced toward both the article side and the scrap side by the opposite blade surfaces so that the upper and lower film parts will be fused reliably. However, only the film edge portion toward the article must be sealed without fail; in this invention, therefore, the blade 12 has such unique contour. In this example, the blade surface is directed to the article side.

When fusing and sealing the film 5 by the fusing and sealing blade 12 of this structure, the side surface of the fusing and sealing blade 12 and the contacting film edge portion to be fused along the sealing line are adjusted in length within an appropreiate range by a non-illustrated adjusting means. Generally, if the extent of penetrating increases, the length of the fusing and sealing blade's side surface and that of the contacting portion of the film 5 will increase to increase the extent of sealing after fusing, thus enabling stable sealing. Alternatively, when the sealing surface is to be finished neatly at the sacrifice of sealing strength, the setting-up may be made in such a manner that the distal end of the heating blade 12 is penetrable into the film 5 to a slight extent.

FIGS. 7 through 10 show an automatic package machine according to a second embodiment. This automatic package machine, like the above-mentioned embodiment, comprises a first sealing unit 1 for fusing and sealing an opening parallel to the travelling path of a folded film 5, an article conveying belt 9a for conveying a succession of articles 30 one at a time the first sealing unit 1, a film feed unit 6 holding a film roll 6a and drawing a folded film 5 from the film roll 6a, a film opener 2 for opening the folded film 5 in such a shape as to wrap an article 30, and a second sealing unit 4 situated adjacent to and downstream of the first sealing unit 1 for fusing and sealing the opening perpendicularly to the travelling path of the film 5.

The first sealing unit 1, which is a characteristic feature of this invention, is situated adjacent to and downstream of the article conveying belt 9a. The first sealing unit 1 includes first and second feed roller pairs 10, 11 arranged at upstream and downstream positions spaced a predetermined distance along the travelling path of the film 5, an electrostatic charging unit 20 for adhering upper and lower film parts 5a, 5b to each other, and a film fusing and sealing unit 23. The first and second feed roller pairs 10, 11 constitutes a film feed unit to be intermittently driven by a nonillustrated motor via a driving shaft 18 and a driving belt 19, feeding the film 5 together with an article 30 in synchronism with the article transfer belt 3. The electrostatic charging unit 20 and the film fusing and sealing unit 23 is situated apart along the film sealing line between the first and second feed rollers 10, 11. In order to fuse and seal the folded film 5, the first sealing unit 1 should be located on one side edge parallel to the film travelling path. However, in an automatic package machine of the type in which an article 30 is placed between two films superposed, two identical first sealing units 1 may be located one on each side of the film travelling path.

The electrostatic charging unit 20 has an electrode bar 21 and an electrode plate 22 situated above and below, respectively, the travelling path of the folded film 5. The film fusing and sealing unit 23 includes a heater body 24 and a bar-shaped fusing and sealing blade 24a projecting from the lower end of the heater body 24. The electrostatic charging unit 20 charges static electricity on the folded film 5 travelling between the electrode bar 21 and the electrode plate 22 to cause the upper and lower film parts 5a, 5b to adhere to each other by the action of static electricity. Since the film parts 5a, 5b adhere to each other entirely uniformly in the charging unit 20 as is well known in the art, air will not exist between the upper and lower film parts 5a, 5b at the subsequent fusing and sealing process. Since the film parts 5a, 5b will adhere to each other in a non-mechanical way, no unnatural force will act on the film parts 5a, 5b so that the subsequent fusing and sealing process can be streamlined. The remarkable advantage of this electrostatic charging unit 20 is that the degree of intimate contact is not reduced even when the film parks 5a, 5b are heated, thus making the subsequent fusing and sealing process more smoothly.

The bar-shaped fusing and sealing blade 24a of time film fusing and sealing unit 23 is in the form of a cylindrical metal bar having an acute distal end; the temperature of the bar-shaped fusing and sealing blade 24a is controlled to be higher than the melting temperature and lower than the combustion temperature of a folded film 5 by the heater body 24. This temperature depends on the quality of film; in the case of polyethylene, for example, the temperature should be set to around 200° C. The melted range of the film 5 is determined on the position where the distal end of the bar-shaped fusing and sealing blade 24a contacts with the film 5; in order to increase the melted range, the distal end of the bar-shaped fusing and sealing blade 24a should be shifted to a lower position so as that the major diameter portion of the bar-shaped fusing and sealing blade 24a can contact with the film 5. In order to reduce the melted range, on the contrary, the barshaped fusing and sealing blade 24a is raised so that the minor diameter portion of the bar-shaped fusing and sealing blade 24a can contact with the film 5. As the film 5 is melted to a certain extent, a melted portion is formed at the upper and lower edge portions of the folded film 5, and when this melted portion is cooled, the upper and lower edge portions are sealed integrally. Accordingly the melted range of the film 5 should preferably be somewhat wide.

According to the automatic package machine of FIGS. 7 through 10, as the automatic package machine with the article conveying belt 9a carrying an article 30 is started, the feed roller pairs 10, 11 begin to rotate so that the folded film 5 is drawn from the film roll 6a and is then turned by 90° to the travelling direction by the film opener 2. Then the folded film 5 is inverted and is conveyed to the first sealing unit 1 while it is being opened into a generally C-shaped cross section. At that time, the successive articles 30 carried on the article conveying belt 9a being moved through the opening of the folded film 5 are introduced one at a time between the upper and lower film parts 5a, 5b.

When the folded film 5 with the article 30 received between the upper and lower film parts 5a, 5b has been moved from the article conveying belt 9a to the first sealing unit 1, one edge of the opening of the folded film 5 will be clamped between the first and second feed roller pairs 10, 11 and will then be advanced to the downstream side. At that time, the upper and lower film parts 5a, 5b between the first and second feed roller pairs 10, 11 are in intimate contact with each other so that fusing and sealing can reliably take place along the sealing line parallel to one edge of the opening of the folded film 5. The folded film 5 having passed the first feed roller pair 10 is charged by the electrostatic charging unit 20, which is the most characteristic part of this invention, thus making an intimate contact between the upper and lower film parts 5a, 5b.

Since this contact is not due to any mechanical external force such as by the film pressers or belts, but due to the electrical adhesion, it is possible not only to improve in keeping the intimate contact which prevents from peeling off, but also to realize uniform contact between the upper and lower film parts 5a, 5b along a predetermined width. Such contact performance will not be deteriorated even by heating. As a result, the superposed film parts are kept in uniform contact with each other along a certain width until at least they reach the feed roller pair 11 via the bar-shaped fusing and sealing blade 24a, so that air existing between the upper and lower film parts 5a, 5b will be perfectly eliminated from the film portion to be sealed. It is therefore possible to secure adequate and neat sealing with the simple fusing and sealing means such as the bar-shaped fusing and sealing blade 24a. Downstream of the first sealing unit 1, a roll 26 for winding scrap portions of time film 5 fused and cut by the bar-shaped fusing and sealing blade 24a is situated and is driven in synchronism with the driving of the feed roller pairs 10, 11.

Upon termination of the film feed, a nonillustrated cylinder of the second sealing unit 4 will become operative to lower the fusing and cutting bar 4a toward the receiving member 4b so that the upper and lower film parts 5a, 5b will be fused and sealed along the rear sealing line of the folded film 5, thus finalizing the wrapping.

At that time the bar-shaped fusing and sealing blade 24a of the film fusing and sealing unit 23 should not be necessarily raised to retract from the contact position where it is in contact with the film 5. Since the thermal capacity of the bar-shaped fusing and sealing blade 24a is small, even while the feed of film 5 is stopped, the melted portions of the film 5 will not be increased. Upon completion of fusing and sealing the rear end of the film 5 by the second sealing unit 4, all of the parts such as the article conveying belt 9a, the wrapped article transfer belt 3, the wrapped article discharging belt 9 and the first and second feed roller pairs 10, 11 will become operative so that the sealing of side edge of the film 5 for the following article 30 by the first seal unit 1 will take place in the above-mentioned manner. The wrapped article 30 will then be discharged from the wrapped article discharging belt 9 to the next station such as a shrinking belt 9 to the next station such as a shrinking station where the film 5 will be shrunk while passing through a non-illustrated heating tunnel.

According to the automatic package machine of this embodiment, the side edge portions of the upper and lower film parts 5a, 5b can adhere to each other stably by the electrostatic charging unit 20, and the fusing and sealing of the opening of the film 5 can take place reliably by melting the adhered portion at a predetermined position. Since the sealing length of the sealing unit can be set as desired, it is possible to wrap elongate articles 30 articles of different lengths by the same machine so that the sealing unit, unlike the conventional L-type sealer, can be reduced in size.

Various changes and modifications may be made to the automatic package machine of this invention. For example, the article conveying unit should by no means be limited to a belt conveyer and may be substituted by an article pushing unit having a pusher. Likewise, the article feed unit also may be substituted by a feeder other than a belt conveyer. Particularly in the second arrangement of this invention, one of the upstream and downstream feed roller pairs may be omitted; for example, mere guide rollers or guide rods may be situated only on the upstream side of the travelling path of film, or a pair of feed rollers may be situated only on the downstream side, so that the desired result can be adequately achieved.

Further, as a remarkable feature of this invention, since the sealing length of the sealing unit can be set as desired, it is possible to wrap elongate articles or articles of different lengths by the same machine so that the sealing unit, unlike the conventional L-type sealer, can be reduced in size.

What is claimed is:

1. An automatic package machine comprising:
   (a) a roll of wrapping film;
   (b) a film opener for opening the film, which is drawn from said roll, into such a shape that the film can wrap an article to be wrapped;
   (c) a conveyer for introducing the article, which is to be wrapped, into the opening of the film opened by said film opener; and
   (d) a sealing unit situated contiguously to a downstream end of said conveyer for sealing edge portions of the film opening, said sealing unit including a heater body, a fusing and sealing blade being heated by said heater body, projecting from one end of said heater body, being vertically adjustable solely or together with said heater body, and being penetrable into the edge portions of the film opening parallel to a travelling path of the film, and two pairs of upper and lower feed rollers situated upstream and downstream, respectively, of said fusing and sealing blade, said fusing and sealing blade having along at least its upstream side edge a cutting edge.

2. An automatic package machine according to claim 1, wherein said cutting edge of said fusing and sealing blade has a generally V shape in either cross-section or horizontal cross section, the angle of the V shape of said cutting edge being within a range of 5 to 15°.

3. An automatic package machine according to claim 1, wherein said cutting edge is formed along only a distal end of the edge of said fusing and sealing blade.

4. An automatic package machine according to claim 1, wherein said cutting edge is formed along the entire edge of said fusing and sealing blade.

5. An automatic package machine according to claim 1, wherein said downstream feed rollers are rotatable at a rotational speed higher than the rotational speed of said upstream feed rollers.

6. An automatic package machine comprising:
   (a) a roll of wrapping film;
   (b) a film opener for opening the film, which is drawn from said roll, into such a shape that the film can wrap an article to be wrapped;

(c) a conveyer for introducing the article, which is to be wrapped, into the opening of the film opened by said film opener; and (d) a sealing unit situated contiguously to a downstream end of said conveyer for sealing edge portions of the film opening, said sealing unit including fusing means for fusing the edge portions of the film opening parallel to a travelling path of the film, and electrostatically charging means situated adjacent to the edge portions of the film opening between near said conveyer and said fusing means.

7. An automatic package machine according to claim 6, wherein said fusing means includes a heater body and a fusing and sealing blade being heated by said heater body, projecting from one end of said heater body, being vertically adjustable solely or together with said heater body, and being penetrable into the edge portions of the film opening parallel to the travelling path of the film, said fusing and sealing blade having at least along its upstream side edge a cutting edge.

8. An automatic package machine according to claim 6, wherein said cutting edge of said fusing and sealing blade has a generally V shape in either cross-section or holizontal cross section, the angle of the V shape of said cutting edge being within a range of 5° to 15°.

9. An automatic package machine according to claim 6, wherein said cutting edge is formed along only a distal end of the edge of said fusing and sealing blade.

10. An automatic package machine according to claim 6, wherein said cutting edge is formed along the entire edge of said fusing and sealing blade.

11. An automatic package machine according to claim 6, wherein said fusing means including the heater body, a bar-shaped fusing and sealing blade projecting from one end of said heater body, being vertically adjustable solely or together with said heater body, and being penetrable into the edge portions of the film opening downwardly from the travelling path of the film, said barshaped fusing and sealing blade being tapered toward its lower end.

12. A fusing and sealing blade for use in an automatic package machine including a roll of wrapping film, a film opener for opening the film, which is drawn from the roll, into such a shape that the film can wrap an article to be wrapped, a conveyer for introducing the article, which is to be wrapped, into the opening of the film opened by the film opener, and a sealing unit situated contiguously to a downstream end of the conveyer for sealing edge portions of the film opening, wherein said fusing and sealing blade is projecting from one end of a heater body of the sealing unit and is vertically adjustable solely or together with the heater body, and is penetrable into the edge portions of the film opening parallel to a travelling path of the film, said fusing and sealing blade having along at least its upstream side edge a cutting edge.

13. A fusing blade according to claim 12, wherein said cutting edge has a generally V shape in either cross section or holizontal cross section, the angle of the V shape of said cutting edge being within a range of 5° to 15°.

14. A fusing blade according to claim 12, wherein said cutting edge is formed along only a distal end of the edge of said fusing and sealing blade.

15. A fusing blade according to claim 12, wherein said cutting edge is formed along the entire edge of said fusing and sealing blade.

16. A fusing blade according to claim 12, wherein said cutting edge has on one side a cutting surface and on the other side a perpendicular surface, in which case the cutting surface is situated toward the article to be wrapped.

* * * * *